(12) United States Patent
Terakura (10) Patent No.: US 7,524,117 B2
(45) Date of Patent: Apr. 28, 2009

(54) OPTICAL CONNECTOR

(75) Inventor: Atsuhiro Terakura, Hyogo (JP)

(73) Assignee: Seikoh Giken Co., Ltd, Chiba (JP)

( * ) Notice: Subject to any disclaimer, the term of this patent is extended or adjusted under 35 U.S.C. 154(b) by 0 days.

(21) Appl. No.: 11/856,045

(22) Filed: Sep. 16, 2007

(65) Prior Publication Data

US 2008/0056646 A1 Mar. 6, 2008

Related U.S. Application Data

(62) Division of application No. 11/387,680, filed on Mar. 24, 2006, now Pat. No. 7,377,699.

(30) Foreign Application Priority Data

Mar. 24, 2005 (JP) .......................... P2005-086629

(51) Int. Cl.
*G02B 6/38* (2006.01)
*G02B 6/36* (2006.01)
(52) U.S. Cl. .............................. 385/69; 385/55; 385/58; 385/60; 385/66; 385/76; 385/77; 385/78; 385/84
(58) Field of Classification Search .................... 385/58, 385/60, 66, 69, 78, 84, 86
See application file for complete search history.

(56) References Cited

U.S. PATENT DOCUMENTS

| | | | | |
|---|---|---|---|---|
| 6,102,581 A | * | 8/2000 | Deveau et al. | 385/56 |
| 6,155,146 A | * | 12/2000 | Andrews et al. | 81/461 |
| 6,206,581 B1 | * | 3/2001 | Driscoll et al. | 385/78 |
| 6,287,018 B1 | * | 9/2001 | Andrews et al. | 385/60 |

(Continued)

FOREIGN PATENT DOCUMENTS

JP 08327855 12/1996

(Continued)

*Primary Examiner*—Frank G Font
*Assistant Examiner*—Ryan Lepisto
(74) *Attorney, Agent, or Firm*—Carlson, Gaskey & Olds PC (57) ABSTRACT

To extend the service life of a latch of a plug housing and facilitate assembly and aligning operations of an optical connector. The optical connector includes a latch provided in a cantilever form on an external surface of the optical connector and deformable for attachment/detachment with respect to an adaptor, and an excessive deformation preventing unit that prevents excessive deformation of the latch. Furthermore, the optical connector comprises: a ferrule including a flange having a largest width portion having directionality in a circumferential direction and a conical portion continuous to the front of the largest width portion; and a housing including a cavity having a cylindrical portion through which the largest width portion can pass freely, a housing unit arranged in front of the cylindrical portion for housing the largest width portion, and an inclined surface that is arranged at a junction between the cylindrical portion and the housing unit and inclines inward in the radial direction from the cylindrical portion toward the housing unit, wherein the point of the ferrule is protruded from the point of the housing by a predetermined amount and held, in the state that the ferrule is inserted into the housing from a rear end of the cylindrical portion and the largest width portion of the flange is housed in the housing unit.

6 Claims, 12 Drawing Sheets

U.S. PATENT DOCUMENTS

| | | | |
|---|---|---|---|
| 6,293,710 B1 * | 9/2001 | Lampert et al. | 385/78 |
| 6,325,547 B1 * | 12/2001 | Cammons et al. | 385/76 |
| 6,663,293 B2 * | 12/2003 | Lampert et al. | 385/78 |
| 6,752,538 B1 | 6/2004 | Bates, III | |
| 7,147,385 B2 * | 12/2006 | Zimmel et al. | 385/78 |

FOREIGN PATENT DOCUMENTS

| | | |
|---|---|---|
| JP | 09113750 | 5/1997 |
| JP | 09113762 | 5/1997 |
| JP | 09127370 | 5/1997 |

* cited by examiner

OPTICAL CONNECTOR

RELATED APPLICATIONS

This application is a divisional of U.S. patent application Ser. No. 11/387,680, filed Mar. 24, 2006, now U.S. Pat. No. 7,377,699 and is based upon and claims the benefit of priority from the prior Japanese Patent Application No. 2005-086629, filed on Mar. 24, 2005; the entire contents of which are incorporated herein by reference.

BACKGROUND OF THE INVENTION

The present invention relates to an optical connector fitted to an end of an optical fiber and attached to or detached from an adaptor.

Generally, the above type of optical connectors include one which is fixed to the adaptor by a latch projected outward in a cantilever form on an external surface of the connector.

Figure 1:
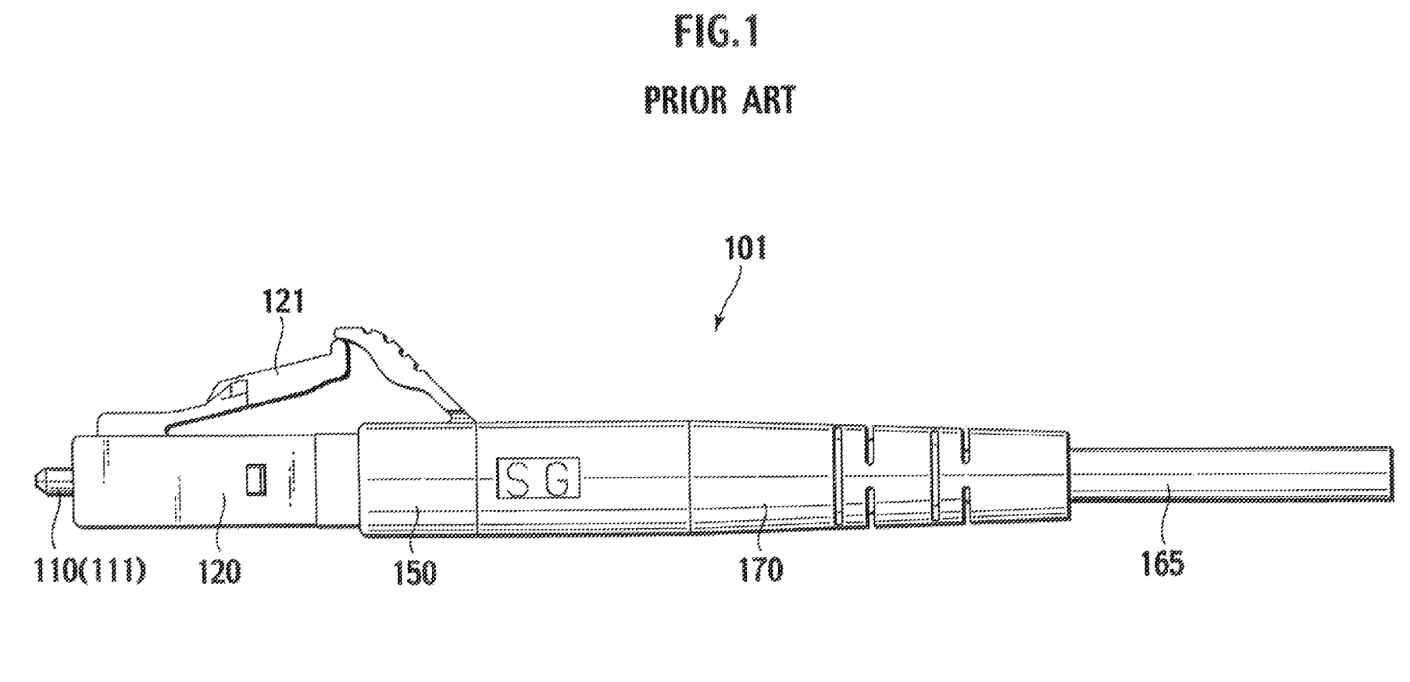
FIG. 1 is a front elevation of an example of a conventional optical connector.
Figure 2:
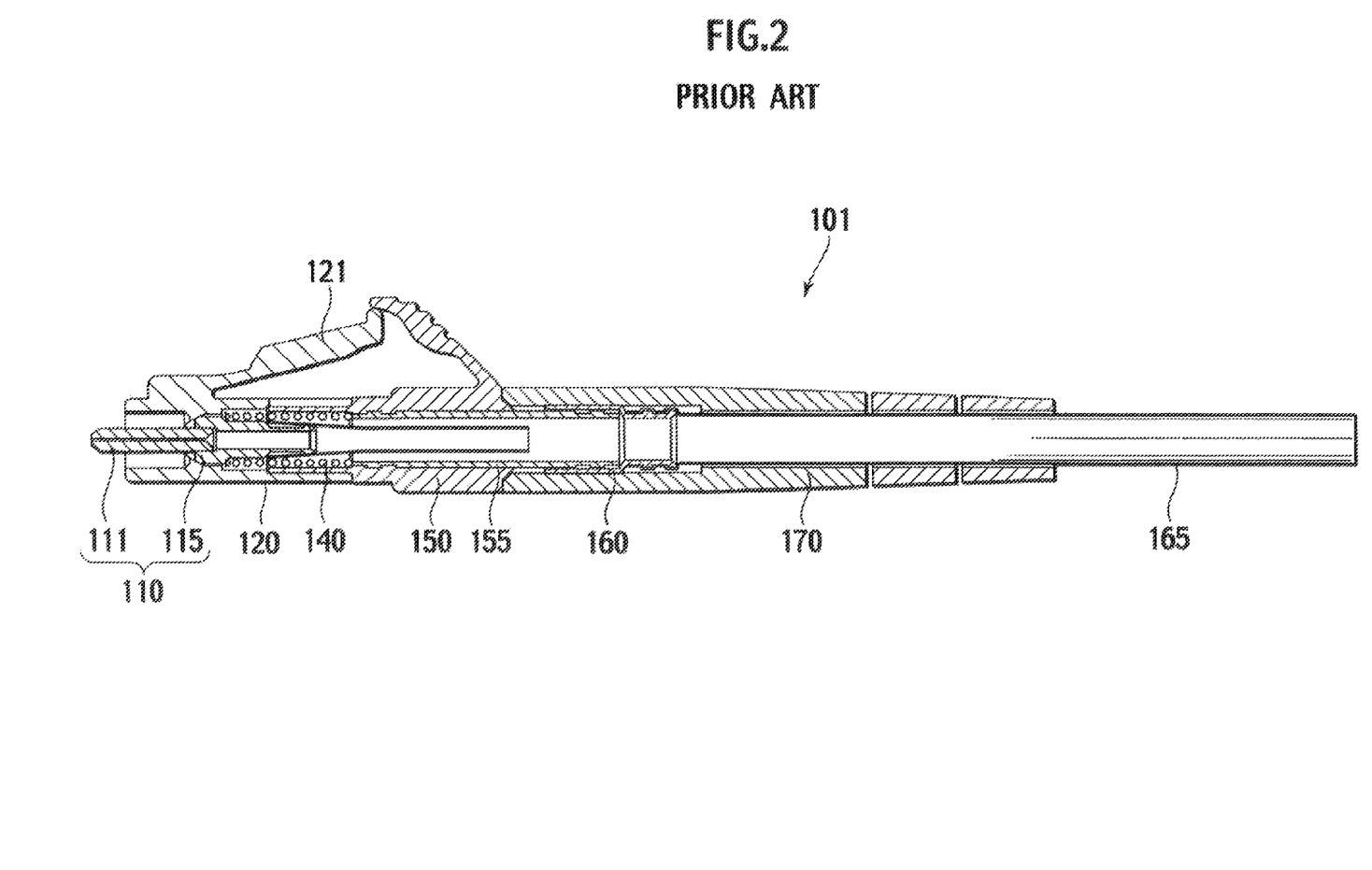
FIG. 2 is an elevational longitudinal section of FIG. 1.

A conventional optical connector 101 shown in FIGS. 1 and 2 includes a ferrule 110 formed of a ferrule body 111 and a flange 115, and a plug housing 120. The optical connector 101 includes a latch 121 deformable for attachment/detachment with respect to the adaptor, on the external surface of the plug housing 120 in the cantilever form.

In FIGS. 1 and 2, reference sign 140 denotes a spring, 150 denotes a stop ring, 155 denotes a retention member, 160 denotes a clip sleeve, 165 denotes a heat shrinkable tube, and 170 denotes a hood.

The optical connector is disclosed in Japanese patent No. 3066322, Japanese Patent Application Laid-Open No. H9-113762, Japanese patent No. 3103773, and Japanese Patent Application Laid-Open No. H8-327855.

However, the conventional optical connector has the following problems.

That is, when the connector is attached to and detached from the adaptor repetitively about 500 times, the latch 121 of the plug housing 120 is broken, and cannot maintain the function as the connector.

When the connector is assembled, it is difficult to insert the ferrule 110 in the plug housing 120.

Furthermore, in an aligning operation, such a state that the ferrule 110 retracts and does not return to an original position occurs.

SUMMARY OF THE INVENTION

The present invention has been achieved in order to solve the above problems, and one object of the present invention is to extend the service life of the latch of the plug housing, and another object is to provide an optical connector that can facilitate assembling and aligning operations of the connector.

To achieve the objects, according to one aspect of the present invention, there is provided an optical connector that includes a latch provided in a cantilever form on an external surface of the optical connector and deformable for attachment/detachment with respect to an adaptor, and an excessive deformation preventing unit that prevents excessive deformation of the latch.

According to another aspect of the present invention, there is provided an optical connector, wherein the excessive deformation preventing unit is formed as a protrusion on the external surface of the optical connector, to which a free end of the latch approaches when the latch deforms.

According to a still another aspect of the present invention, there is provided an optical connector, comprising: a ferrule including a flange having a largest width portion having directionality in a circumferential direction and a conical portion continuous to the front of the largest width portion; and a housing including a cavity having a cylindrical portion through which the largest width portion can pass freely, a housing unit arranged in front of the cylindrical portion for housing the largest width portion, and an inclined surface that is arranged at a junction between the cylindrical portion and the housing unit and inclines inward in the radial direction from the cylindrical portion toward the housing unit, wherein the point of the ferrule is protruded from the point of the housing by a predetermined amount and held, in the state that the ferrule is inserted into the housing from a rear end of the cylindrical portion and the largest width portion of the flange is housed in the housing unit.

According to a still another aspect of the present invention, there is provided an optical connector, wherein the largest width portion of the flange is formed in a polygonal shape in cross section, and the housing unit of the housing is formed in a polygonal shape corresponding to the largest width portion.

According to a still another aspect of the present invention, there is provided an optical connector, wherein the diameter of the cylindrical portion is formed equal to the diameter of a circle circumscribing to the polygonal housing unit.

According to a still another aspect of the present invention, there is provided an optical connector, comprising: a ferrule including a flange having a largest width portion having directionality in a circumferential direction and a conical portion continuous to the front of the largest width portion; a housing including a cavity having a cylindrical portion through which the largest width portion can pass freely, a housing unit arranged in front of the cylindrical portion for housing the largest width portion, an inclined surface that is arranged at a junction between the cylindrical portion and the housing unit and inclines inward in the radial direction from the cylindrical portion toward the housing unit, and a support surface continuous to the housing unit and corresponding to the conical portion; and a pressing member that presses the largest width portion forward, when the ferrule is inserted into the housing from a rear end of the cylindrical portion, wherein the point of the ferrule is protruded from the point of the housing by a predetermined amount and held, in the state that the largest width portion of the flange is housed in the housing unit, and the conical portion is pressed against the support surface corresponding thereto by the pressing member.

According to a still another aspect of the present invention, there is provided an optical connector, wherein the pressing member is arranged in a space between the circumference of the flange at the back of the largest width portion and the cylindrical portion.

According to a still another aspect of the present invention, there is provided an optical connector, comprising: a latch provided in a cantilever form on an external surface of the housing and deformable for attachment/detachment with respect to an adaptor; and an excessive deformation preventing unit that prevents excessive deformation of the latch.

According to a still another aspect of the present invention, there is provided an optical connector, wherein the excessive deformation preventing unit is formed as a protrusion on the external surface of the housing, to which a free end of the latch approaches when the latch deforms.

According to a still another aspect of the present invention, there is provided an optical connector, wherein the largest width portion of the flange is formed in a polygonal shape in cross section, and the housing unit of the housing is formed in a polygonal shape corresponding to the largest width portion.

According to a still another aspect of the present invention, there is provided an optical connector, wherein the diameter of the cylindrical portion is formed equal to the diameter of a circle circumscribing to the polygonal housing unit.

These and other features of the present invention can be best understood from the following specification and drawings, the following of which is a brief description.

BRIEF DESCRIPTION OF THE DRAWINGS

These and other objects and the configuration of this invention will become clearer from the following description of the preferred embodiments, read in connection with the accompanying drawings in which.

DETAILED DESCRIPTION OF THE PREFERRED EMBODIMENT

Embodiments of the present invention will be described with reference to the drawings.

Figure 3:
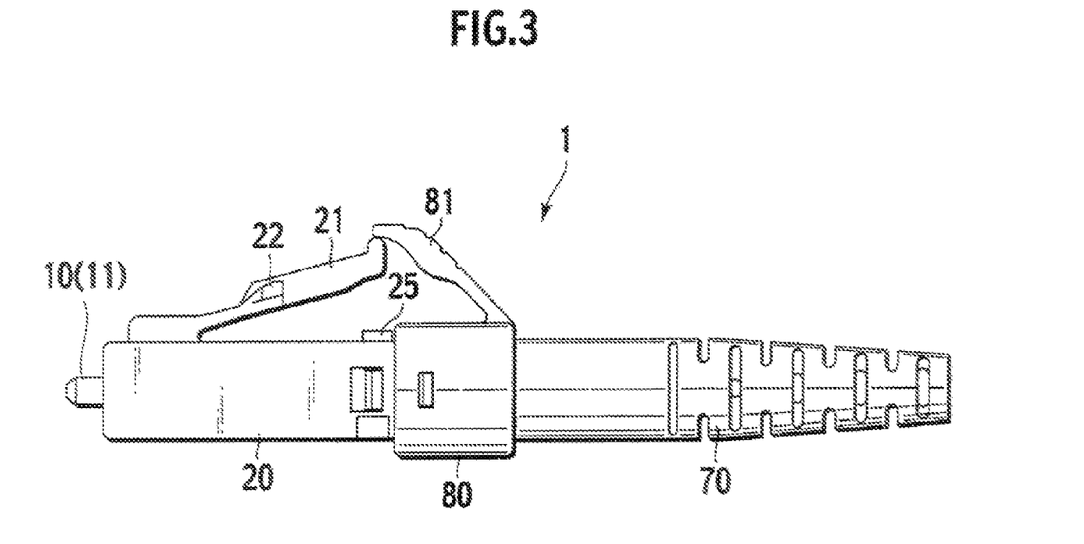
FIG. 3 is a front elevation of an embodiment of an optical connector according to the present invention.
Figure 4:
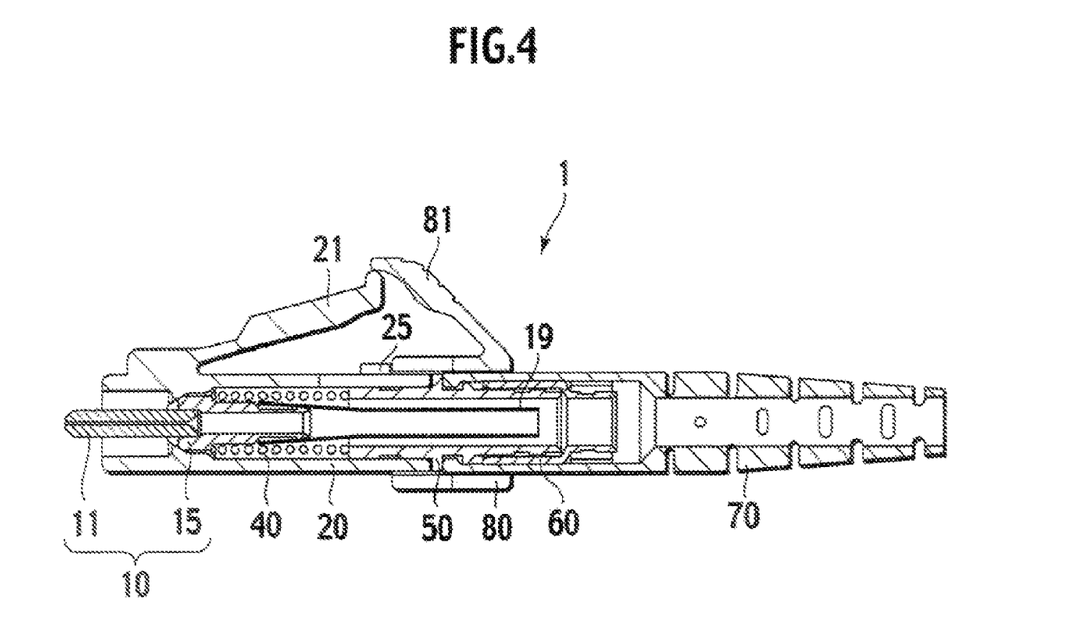
FIG. 4 is an elevational longitudinal section of FIG. 3.

FIG. 3 is a front elevation of an embodiment of an optical connector according to the present invention, and FIG. 4 is an elevational longitudinal section of FIG. 3. An optical connector 1 includes a ferrule 10 and a housing (plug housing) 20.

Figure 5:
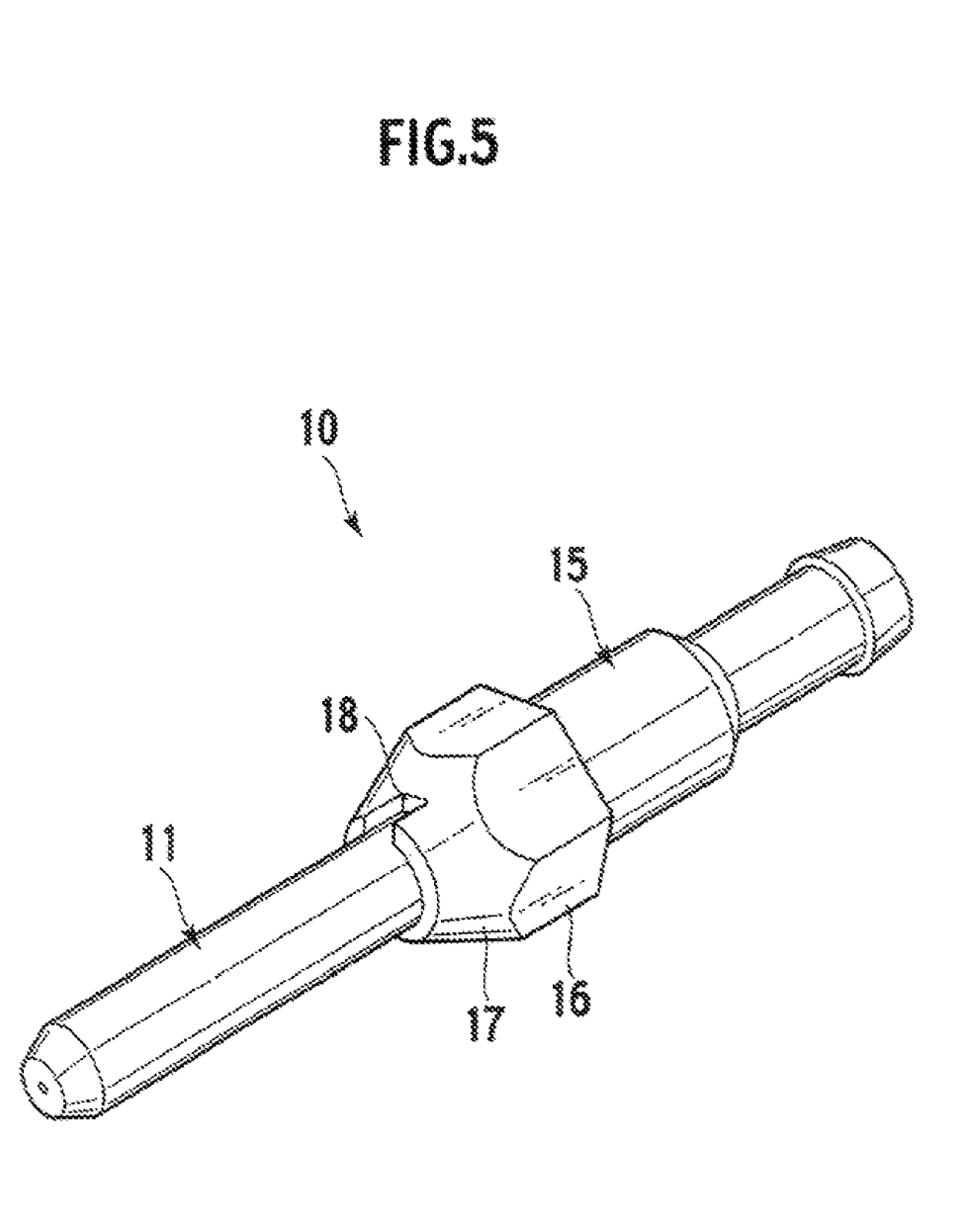
FIG. 5 is a perspective view of a ferrule.

The ferrule 10 includes, as shown in FIG. 5, a ferrule body 11 and a flange 15.

In the ferrule body 11, an optical fiber is inserted into a central hole and fixed thereto, and a point of the ferrule body 11 is grinded so as to suit to optical connection.

A base of the ferrule body 11 is mounted on the point of the flange 15. The flange 15 includes a largest width portion 16 in a hexagonal shape and a conical portion 17 continuous to the front of the largest width portion 16. A notch 18 is formed at one position on the circumference of the conical portion 17.

As shown in FIGS. 6A, 6B, 6C, 7A, and 7B, the plug housing 20 includes a latch 21 deformable for attachment/ detachment with respect to the adaptor on an external surface thereof in a cantilever form. The plug housing 20 includes an excessive deformation preventing unit 25 that prevents an excessive deformation of the latch 21.

The excessive deformation preventing unit 25 is formed as a protrusion on the external surface of the plug housing 20, to which a free end of the latch 21 approaches when the latch 21 deforms.

Figure 6A:
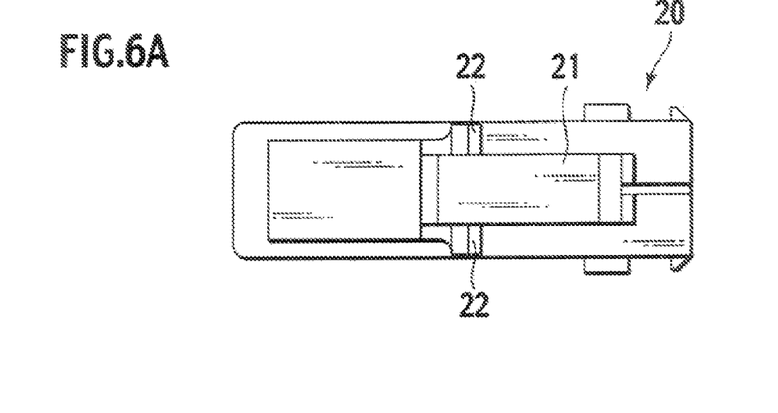
FIG. 6A is a plan view of a housing.
Figure 6B:
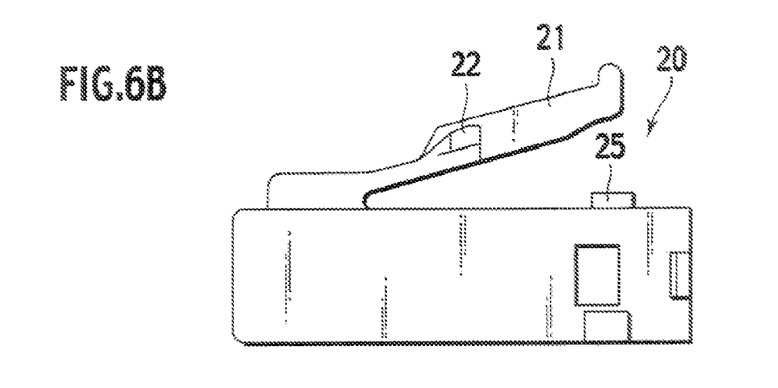
FIG. 6B is a front elevation of the housing.
Figure 6C:
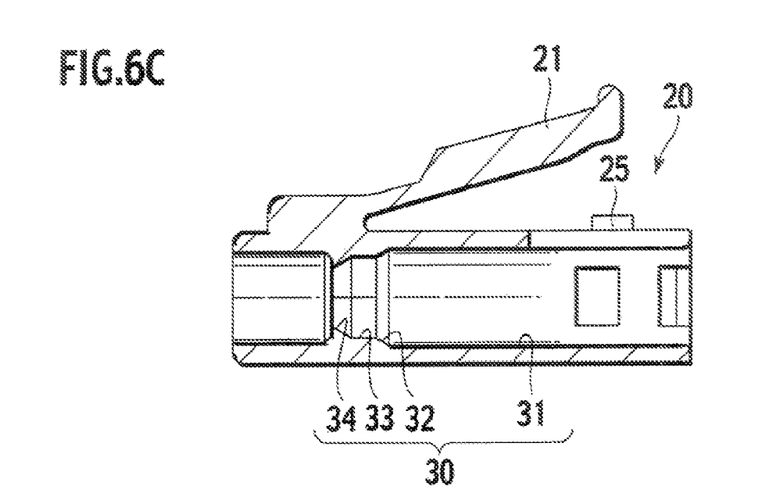
FIG. 6C is an elevational longitudinal section of the housing.
Figure 7A:
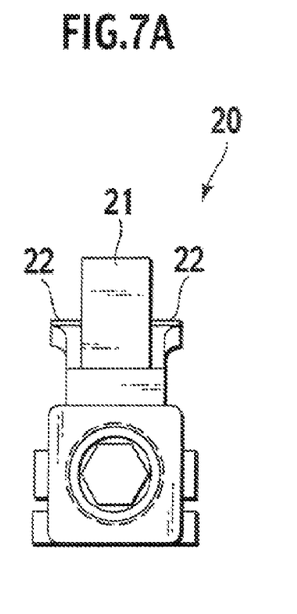
FIG. 7A is a point side end view of the housing.
Figure 7B:
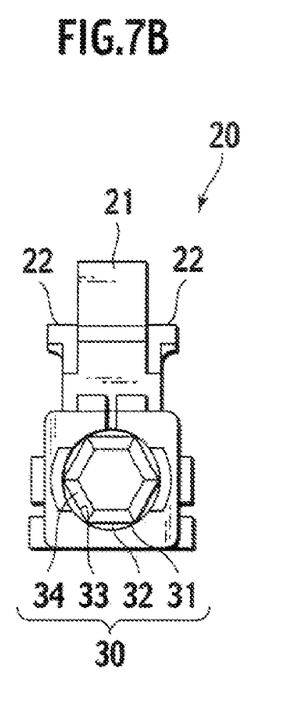
FIG. 7B is a bottom side end view of the housing.
Figure 8:
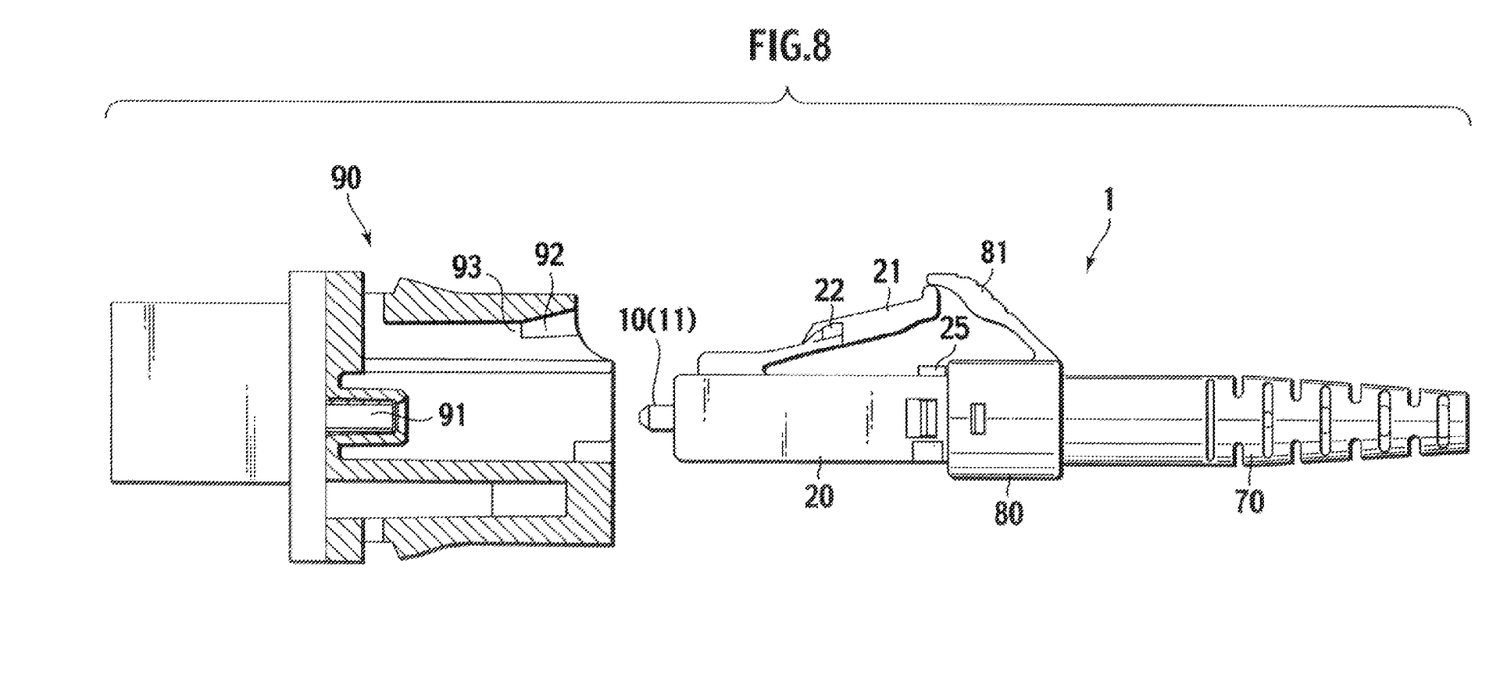
FIG. 8 is a longitudinal section of an adapter and a front elevation of the optical connector.

In the plug housing 20, a cavity 30 that passes through the opposite ends thereof is formed.

In the cavity 30 of the plug housing 20, there is formed a cylindrical portion (cylindrical surface) 31, into which the largest width portion 16 of the ferrule 10 can be freely inserted. A hexagonal housing unit 33 that houses the largest width portion 16 is formed in front of the cylindrical portion 31. A support surface 34 corresponding to the conical portion 17 of the flange 15 is formed in front of the housing unit 33, continuous to the housing unit 33.

The diameter of the cylindrical portion 31 is formed equal to the diameter of a circle circumscribing to the hexagonal housing unit 33. Therefore, the largest width portion 16 of the ferrule 10 can be inserted into the cylindrical portion 31 of the cavity 30, regardless of the angle of the largest width portion 16 with respect to a central axis.

On the other hand, the largest width portion 16 of the ferrule 10 cannot be inserted into the housing unit 33 of the cavity 30, unless the angle is relatively adjusted so that the hexagonal shape of the housing unit 33 agrees with the hexagonal shape of the largest width portion 16.

When the largest width portion 16 of the ferrule 10 is housed in the housing unit 33 of the cavity 30, the conical portion 17 continuous to the largest width portion 16 engages with and abuts against the support surface 34 continuous to the housing unit 33.

An inclined surface 32 that inclines inward in the radial direction from the cylindrical portion 31 toward the housing unit 33 is formed at a junction of the cylindrical portion 31 and the housing unit 33 of the cavity 30.

As shown in FIGS. 3 and 4, the optical connector 1 includes a spring 40 as a pressing member arranged in a space between the circumference of the flange 15 at the back of the largest width portion 16 and the cylindrical portion 31 of the cavity 30, when the ferrule 10 is inserted into the plug housing 20 from the cylindrical portion 31 side.

Since the conical portion 17 is pressed on the support surface 34 by the spring 40, in the state with the largest width portion 16 being housed in the housing unit 33, the optical connector 1 holds the ferrule 10 with the point thereof protruded from the plug housing 20 by a predetermined amount.

A protective tube 19 is fitted to the flange 15 of the ferrule 10, and the ferrule 10 is inserted into the plug housing 20 from the cylindrical portion 31 side. The spring 40 is then positioned by arranging it at the back of the largest width portion 16 and by fitting a stop ring 50 to the plug housing 20.

The optical connector 1 is assembled and integrally formed by mounting a clip ring 60 and a boot 70 on the circumference of the stop ring 50, allowing a clip 80 including a trigger lever 81 to pass over the outer circumference of the junction of the stop ring 50 and the boot 70, and fitting the clip 80 to the plug housing 20.

FIGS. 8 to 11 show one example of an adaptor 90, and indicating how the optical connector 1 is attached and detached with respect to the adaptor 90. The adaptor 90 includes a ferrule housing unit 91 that stores the ferrule 10 protruding from the point of the plug housing 20 of the optical connector 1.

The adaptor 90 includes a projection 92 that presses a protrusion 22 of the latch 21 downward in a process in which the optical connector 1 is inserted and the ferrule 10 is housed in the ferrule housing unit 91 to a predetermined depth. The projection 92 presses the protrusion 22 downward so that the latch 21 is collapsed (deformed) once in a direction approaching to the plug housing 20.

The projection 92 releases the downward pressing towards the protrusion 22 of the latch 21 at a position immediately before the ferrule 10 is housed in the ferrule housing unit 91 to the predetermined depth. As a result, the latch rises toward the original state due to a spring force of the latch 21 (the deformation is restored to the original state).

Figure 10:
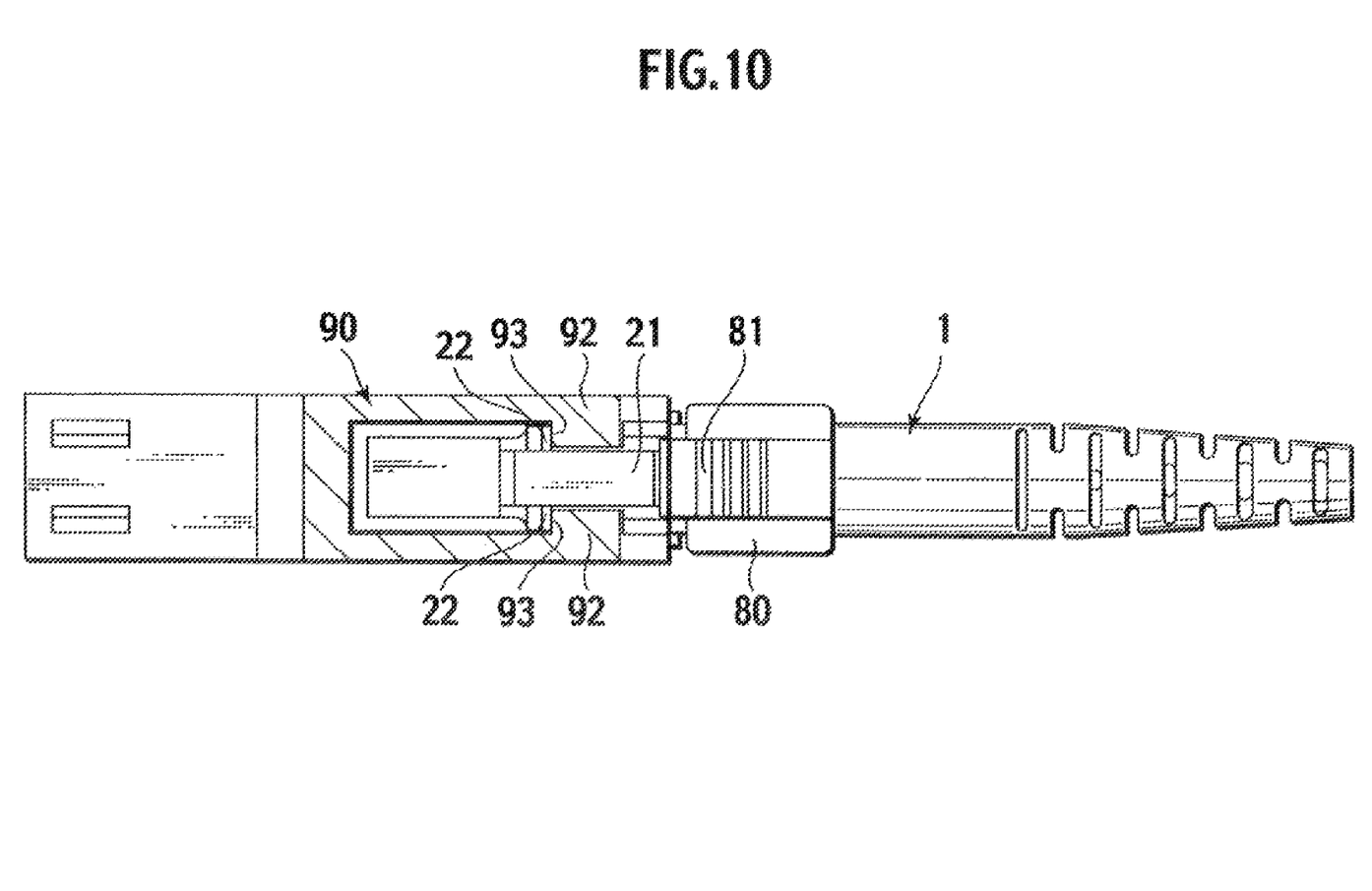
FIG. 10 is a plan view of the state of the latch when the optical connector is attached to an adaptor.
Figure 11:
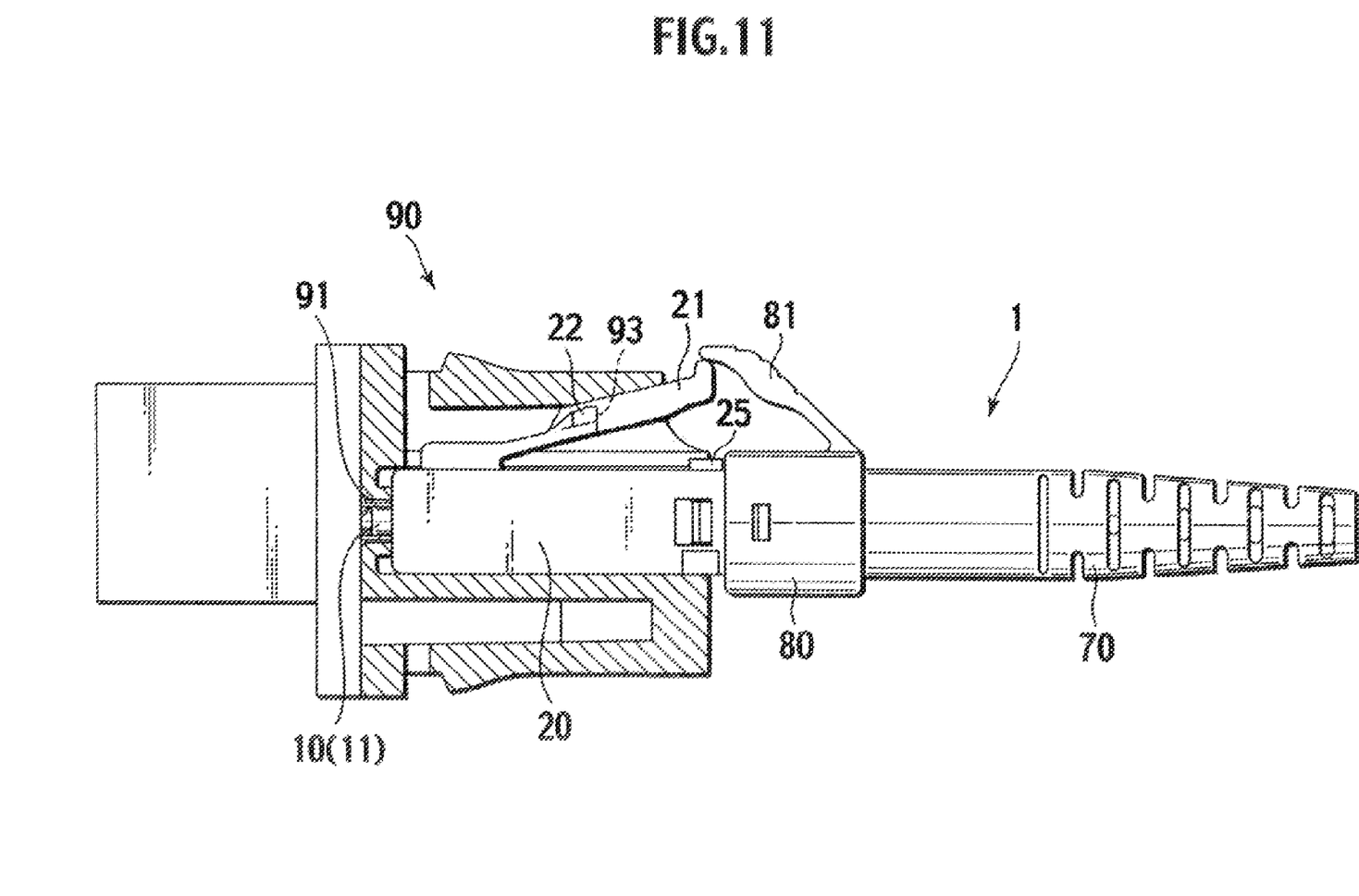
FIG. 11 is a front elevation of FIG. 10.

The adaptor 90 includes an engaging unit 93, with which the protrusion 22 engages, when the protrusion 22 passes the projection 92 and the latch 21 rises due to its own spring force (when the deformation is restored). Since the protrusion 22 of the latch 21 engages with the engaging unit 93, the optical connector 1 is attached to the adaptor 90.

When the optical connector 1 is detached from the adaptor 90, the trigger lever 81 is pressed down to bring the latch 21 down, thereby detaching the protrusion 22 from the engaging unit 93 of the adaptor 90. The protrusion 22 of the latch 21 is allowed to pass below the projection 92, and the optical connector 1 is pulled out, thereby detaching the optical connector 1 from the adaptor 90.

Figure 9:
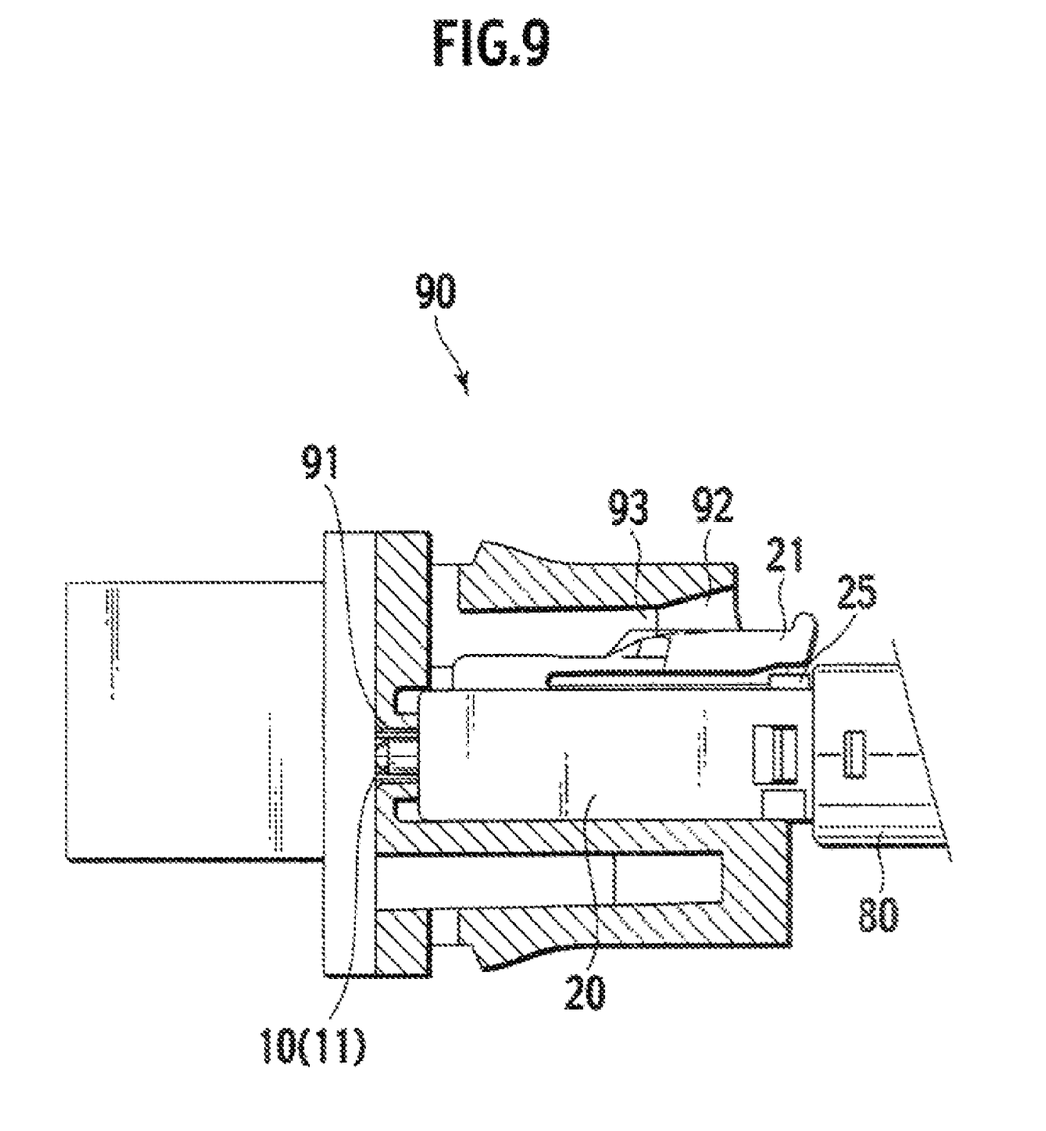
FIG. 9 is a front view of the state of a latch in a process of attaching the optical connector to the adaptor.

When the trigger lever 81 is pressed down, a free end of the latch 21 abuts against the excessive deformation preventing unit 25 on the upper surface of the plug housing 20. As a result, the latch 21 is prevented from deforming largely.

In other words, the excessive deformation preventing unit 25 restricts the collapsed amount of the latch 21, so that the latch 21 is sufficiently brought down up to a height required for the protrusion 22 to pass below the projection 92 of the adaptor 90, but is not brought down more than necessary.

As a result, even when attachment and detachment of the optical connector 1 with respect to the adaptor 90 is repeated, the deformed amount of the latch 21 is kept to a required amount at all times, and the latch 21 is not largely deformed more than necessary. Accordingly, the service life of the latch 21 is extended, and resistance against attachment/detachment of the optical connector 1 can be greatly improved, as compared to a conventional optical connector having no excessive deformation preventing unit 25.

That is, in the case of the optical connector 101 shown in FIGS. 1 and 2, when attachment/detachment of the optical connector 101 with respect to the adaptor is repeated 500 times, the latch 121 of the plug housing 120 is broken.

On the other hand, in the case of the optical connector 1, when such an experiment is executed that attachment/detachment of the optical connector 1 with respect to the adaptor 90 is repeated until the latch 21 of the plug housing 20 is broken, the latch 21 was not broken, even when attachment/detachment operations are repeated 3000 times.

When the optical connector 1 is to be assembled, the ferrule 10 is inserted into the plug housing 20 from the cylindrical portion 31 side and the stop ring 50 is fitted to the plug housing 20, while pressing the ferrule 10 in a direction of the point thereof by the spring 40.

At this time, it is necessary to insert the hexagonal largest width portion 16 of the ferrule 10 into the hexagonal housing unit 33 of the plug housing 20, while adjusting the angle thereof.

A cylindrical portion 31 of a size circumscribing to the hexagonal housing unit 33 is formed on this side of the housing unit 33 of the plug housing 20, at the time of an assembly operation.

Figure 12A:
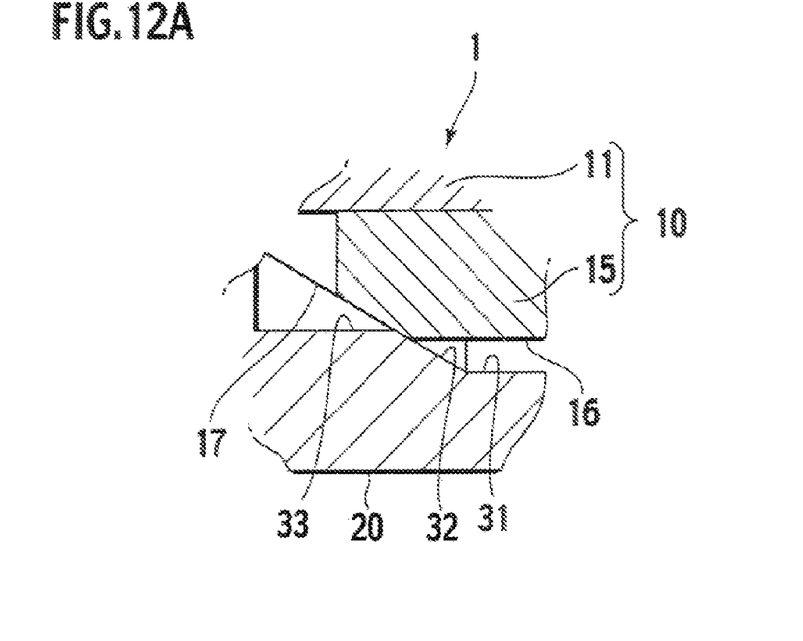
FIGS. 12A and 12B are enlarged cross sections for comparing a case of including an inclined face at a junction of a cylindrical portion and a housing unit (FIG. 12A), and a case of not including the inclined face (FIG. 12B)
Figure 12B:
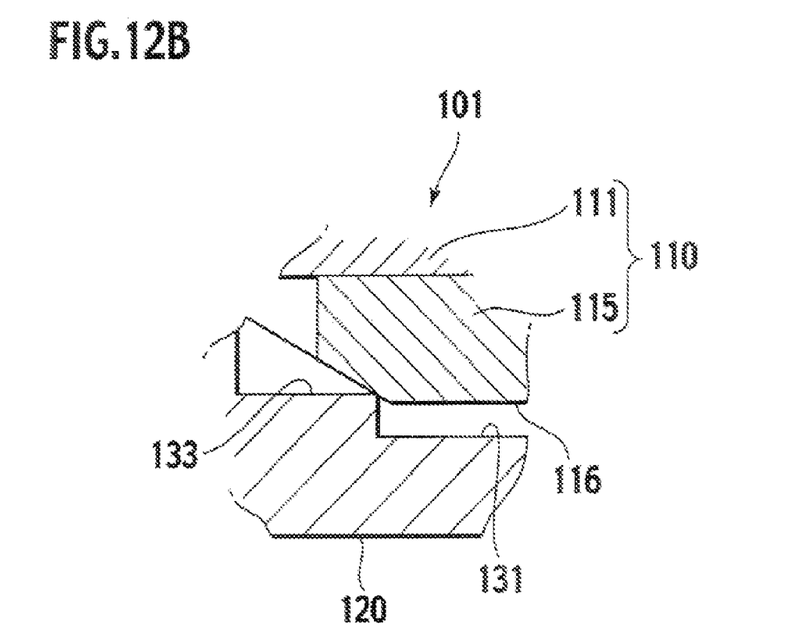

In the conventional optical connector 101, as shown in FIG. 12B, the junction of a cylindrical portion 131 and a housing unit 133 of the plug housing 120 has been connected by a plane orthogonal to the axial direction of the plug housing 120. Therefore, at the time of assembling the optical connector 101, when a hexagonal largest width portion 116 of the ferrule 110 is inserted into a hexagonal housing unit 133 of the plug housing 120, insertion is not possible unless the angles of these hexagonal shapes match with each other.

On the other hand, in the optical connector 1 of the present invention, as shown in FIG. 12A, the plug housing 20 includes the inclined surface 32 that inclines inward in the radial direction from the cylindrical portion 31 toward the housing unit 33 at the junction of the cylindrical portion 31 and the housing unit 33. The ferrule 10 also includes the conical portion 17 in front of the hexagonal largest width portion 16 continuous thereto.

Therefore, when the hexagonal largest width portion 16 of the ferrule 10 is inserted into the hexagonal housing unit 33 of the plug housing 20, and it is tried to relatively adjust the angle of the ferrule 10 and the plug housing 20, the conical portion 17 of the ferrule 10 can freely adjust the angle along the inclined surface 32 of the plug housing 20.

Consequently, at the time of assembling the optical connector 1, the optical connector 1 can be easily assembled, even when there is some angular displacement between the hexagonal largest width portion 16 of the ferrule 10 and the hexagonal housing unit 33 of the plug housing 20.

In some cases, an aligning operation of the optical connector 1 is performed for adjusting the center of the axis between the optical fiber on the adaptor 90 side and the optical fiber of the optical connector 1. In this case, after the ferrule 10 protruding from the point of the optical connector 1 is pushed into the plug housing 20 once, the pushing force is released. Then, the ferrule 10 returns to the original protruded state due to the thrust of the spring 40.

Figure 13A:
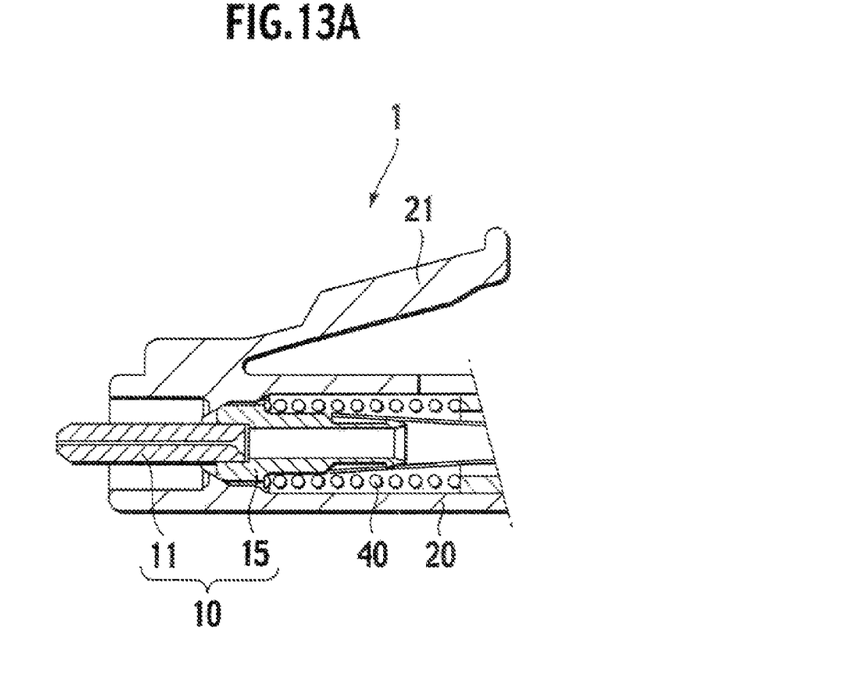
FIGS. 13A and 13B are cross sections of a normal state of the optical connector (FIG. 13A) and a state when the ferrule is pushed in at the time of an aligning operation.
Figure 13B:
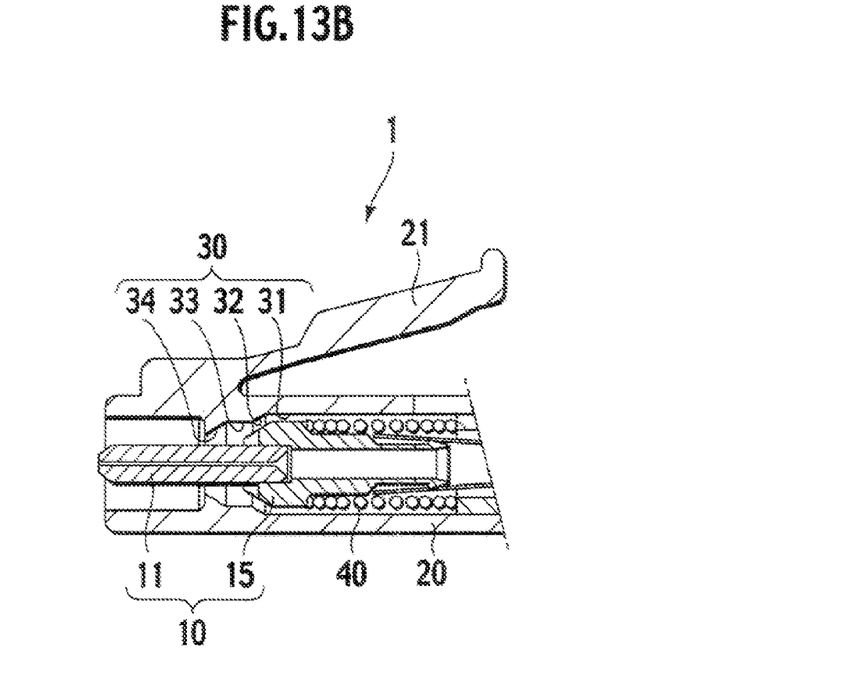

FIG. 13A shows a normal state before the ferrule 10 is pushed in the plug housing, and FIG. 13B shows a state when the ferrule 10 is pushed therein.

When the ferrule 10 returns from the pushed state, the angle can be adjusted by the conical portion 17 of the ferrule 10 along the inclined surface 32 of the plug housing 20. Therefore, even when there is some angular displacement at the time of pushing the ferrule 10 in the plug housing 20, the ferrule 10 does not stay in the pushed state, and movement to return to the normal position can be facilitated.

According to the present invention, the shape of the largest width portion 16 in the flange 15 of the ferrule 10 is not limited to the hexagonal shape, as in the embodiment, and may be an optional polygonal shape. In this case, the shape of the housing unit 33 of the plug housing 20 that stores the largest width portion 16 can be formed in an optional polygonal shape, matched with the shape of the largest width portion 16.

Furthermore, according to the present invention, the shape of the largest width portion 16 of the ferrule 10 can be formed, for example, in a shape having directionality in a circumferential direction by appropriate means. In this case, the shape of the housing unit 33 of the plug housing 20 that stores the largest width portion 16 is also formed in the shape having directionality in a circumferential direction by the same means, matched with the shape of the largest width portion 16.

The object of the present invention is not limited to achieve compatibility between realization of extended service life of the latch 21 and realization of easiness of assembly and the aligning operation of the optical connector 1.

That is, if it is the only object to extend the service life of the latch 21, the inclined surface 32 of the cavity 30 is not necessary, and the excessive deformation preventing unit 25 that prevents excessive deformation of the latch 21 needs only to be provided. The present invention is realized only by this configuration.

Furthermore, if it is the only object to facilitate assembly and the aligning operation of the optical connector 1, the excessive deformation preventing unit 25 of the plug housing 20 is not necessary, and the inclined surface 32 that inclines inward in the radial direction from the cylindrical portion 31 toward the housing unit 33 needs only to be formed at the junction of the cylindrical portion 31 and the housing unit 33 of the cavity 30. The present invention is realized only by this configuration.

The configuration of the present invention includes the latch deformable for attachment/detachment with respect to the adaptor, provided in a cantilever form on the external surface of the connector, and the excessive deformation preventing unit that prevents excessive deformation of the latch. As a result, the service life of the latch of the plug housing can be extended.

Furthermore, according to the present invention, the optical connector comprises: the ferrule including the flange having the largest width portion having directionality in a circumferential direction and the conical portion continuous to the front of the largest width portion; and the housing including the cavity having the cylindrical portion through which the largest width portion can pass freely, the housing unit arranged in front of the cylindrical portion for housing the largest width portion, and the inclined surface that is arranged at a junction between the cylindrical portion and the housing unit and inclines inward in the radial direction from the cylindrical portion toward the housing unit, wherein the point of the ferrule is protruded from the point of the housing by a predetermined amount and held, in the state that the ferrule is inserted into the housing from a rear end of the cylindrical portion and the largest width portion of the flange is housed in the housing unit. Accordingly, the assembly and the aligning operation of the connector can be facilitated.

While preferred embodiments of the present invention have been described above, the foregoing description is in all aspects illustrative. It is therefore understood that numerous modifications can be devised without departing from the spirit or scope of the appended claims of the invention.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An optical connector comprising:
   a ferrule including a flange having a largest width portion having directionality in a circumferential direction and a conical portion continuous to the front of the largest width portion; and
   a housing including a cavity having a cylindrical portion through which the largest width portion can pass freely, a housing unit arranged in front of the cylindrical portion for housing the largest width portion, and an inclined surface that is arranged at a junction between the cylindrical portion and the housing unit and inclines inward in the radial direction from the cylindrical portion toward the housing unit,
   wherein the point of the ferrule is protruded from the point of the housing by a predetermined amount and held, in the state that the ferrule is inserted into the housing from a rear end of the cylindrical portion and the largest width portion of the flange is housed in the housing unit, and wherein the largest width portion of the flange is formed in a polygonal shape in cross section, and the housing unit of the housing is formed in a polygonal shape corresponding to the largest width portion.

2. The optical connector according to claim 1, wherein the diameter of the cylindrical portion is formed equal to the diameter of a circle circumscribing to the housing unit.

3. The optical connector according to claim 1, wherein the inclined surface extends between terminal ends of the cylindrical portion and the housing unit.

4. The optical connector according to claim 1, wherein the inclined surface spans between first and second ends and is directly connected to the cylindrical portion on the first end and to the housing unit on the second end.

5. The optical connector according to claim 1, wherein the inclined surface is sloped relative to walls of the cylindrical portion and the housing unit.

6. An optical connector comprising:
   a ferrule including a flange having a largest width portion having directionality in a circumferential direction and a conical portion continuous to the front of the largest width portion;
   a housing including a cavity having a cylindrical portion through which the largest width portion can pass freely, a housing unit arranged in front of the cylindrical portion for housing the largest width portion, an inclined surface that is arranged at a junction between the cylindrical portion and the housing unit and inclines inward in the radial direction from the cylindrical portion toward the housing unit, and a support surface continuous to the housing unit and corresponding to the conical portion; and
   a pressing member that presses the largest width portion forward, when the ferrule is inserted into the housing from a rear end of the cylindrical portion,
   wherein the point of the ferrule is protruded from the point of the housing by a predetermined amount and held, in the state that the largest width portion of the flange is housed in the housing unit, and the conical portion is pressed against the support surface corresponding thereto by the pressing member, and wherein the pressing member is arranged in a space between the circumference of the flange at the back of the largest width portion and the cylindrical portion.

* * * * *